United States Patent
Boureau et al.

(10) Patent No.: US 8,729,723 B2
(45) Date of Patent: May 20, 2014

(54) REMOVABLE OFFSHORE WIND TURBINES WITH PRE-INSTALLED MOORING SYSTEM

(75) Inventors: Sophie Boureau, Nice (FR); Hein Wille, Eze (FR)

(73) Assignee: Single Buoy Moorings Inc., Marly (CH)

( * ) Notice: Subject to any disclaimer, the term of this patent is extended or adjusted under 35 U.S.C. 154(b) by 187 days.

(21) Appl. No.: 13/164,183

(22) Filed: Jun. 20, 2011

(65) Prior Publication Data

US 2011/0241347 A1    Oct. 6, 2011

Related U.S. Application Data (63) Continuation-in-part of application No. PCT/NL2009/050779, filed on Dec. 18, 2009.

(30) Foreign Application Priority Data

Dec. 18, 2008    (EP) .................................. 08172164

(51) Int. Cl.
F03D 11/00        (2006.01)

(52) U.S. Cl.
USPC .......................................................... 290/55

(58) Field of Classification Search
USPC .......................................................... 290/55
See application file for complete search history.

(56) References Cited

U.S. PATENT DOCUMENTS

| | | | |
|---|---|---|---|
| 6,294,844 B1 | 9/2001 | Lagerwey | |
| 7,453,164 B2 * | 11/2008 | Borden et al. ................... | 290/42 |
| 8,235,629 B2 * | 8/2012 | Jakubowski ................... | 405/224 |
| 8,471,396 B2 * | 6/2013 | Roddier et al. ................. | 290/44 |
| 8,471,399 B2 * | 6/2013 | Lefranc ........................... | 290/55 |
| 2003/0168864 A1 | 9/2003 | Heronemus | |
| 2006/0082160 A1 * | 4/2006 | Lee ................................. | 290/55 |
| 2008/0089746 A1 | 4/2008 | Jakubowski | |
| 2011/0037264 A1 * | 2/2011 | Roddier et al. ................. | 290/44 |

FOREIGN PATENT DOCUMENTS

| | | |
|---|---|---|
| DE | 3224976 | 1/1984 |
| DE | 20008482 U1 * | 9/2000 |
| NL | 1008318 C2 * | 8/1999 |
| WO | WO 9902856 A1 * | 1/1999 |
| WO | 0058621 | 10/2000 |
| WO | 02073032 | 9/2002 |
| WO | WO 02073032 A1 * | 9/2002 |
| WO | 2006121337 | 11/2006 |
| WO | 2007009464 | 1/2007 |

OTHER PUBLICATIONS

International search report dated Nov. 25, 2010 in corresponding PCT/NL2009/050779.

* cited by examiner

*Primary Examiner* — Joseph Waks
(74) *Attorney, Agent, or Firm* — Young & Thompson (57) ABSTRACT

A floating energy generating device includes at least two wind turbines mounted on a floating open structure, the floating open structure being moored to the seabed with a mooring system, each wind turbine featuring in operation mode a blade and rotor part mounted at the top of a tower and being connected via a cable to a central control power electronic unit on the floating open structure, the central control power unit being connected to a submerged high voltage power export cable for exporting the electricity generated by the at least two windmills, characterized in that the floating open structure being connectable to or disconnectable from the mooring system and that when disconnected from the mooring system, the center of gravity of the floating open structure is at or below its center of buoyancy.

12 Claims, 11 Drawing Sheets

REMOVABLE OFFSHORE WIND TURBINES WITH PRE-INSTALLED MOORING SYSTEM

CROSS REFERENCE TO RELATED APPLICATIONS

This application is a continuation-in-part of International application PCT/NL09/050,779 filed on Dec. 18, 2009; which claimed priority to European application 081721643.9 filed Dec. 18, 2008. The entire contents of each of the above-identified applications are hereby incorporated by reference.

BACKGROUND OF THE INVENTION

The invention relates to a floating wind energy generating device comprising at least two wind turbines mounted on a floating open structure, each of said at least two wind turbines featuring a blade and rotor part mounted at the top of a tower, said floating open structure being moored to the seabed with a mooring system and connected to a single high voltage power export cable for exporting the electricity generated by the at least two windmills.

Device of this kind are known from literature, wherein various proposals have been made as regards to the construction of such a device. It is not known, in particular for wind turbines having large dimensions, how the various problems related to its installation are solved.

A typical state-of-the-art solution for securing offshore wind turbines was to place them on special foundations, which are either lowered onto the sea floor or forced into the seabed. Further, current offshore wind industry practice is to erect large wind turbines designed for onshore use, under complex maritime conditions offshore with the aid of a dedicated jack-up barge aimed at creating a stable working platform for the operations offshore. The currently used dedicated installation equipment poses a risk of major delays in installation works, for example when the jack-up barge encounters a breakdown.

The non-floating offshore wind turbine concepts point to a series of disadvantages such as commissioning, repair and maintenance of the wind turbines which needs to be carried out offshore. This includes the high costs associated with offshore work due to travel, distance, downtime and removal of such foundations after closure and decommissioning of the wind farm. These can be vulnerable to bad weather conditions and by poor installation accessibility.

Another key issue is the substantial risk of extended installation downtime during high winds. Under these conditions dynamic turbine loads are at maximum, yields most favorable, and simultaneously the implications of a breakdown are most severe due to difficult turbine access.

Decommissioning and compulsory removal of permanent foundations at the end of a wind farm's operational service life is also widely considered to be an underestimated cost associated with fixed offshore wind turbines, for which substantial sums must be set aside.

Floating offshore wind turbines can be installed at sites with much greater water depths, out of sight from onshore, with less interference with bird migration, and increased power production due to stronger and more stable wind conditions. In addition, the floating concept might enable the use of conventional, non-dedicated tugboats, which are readily available in any market. This limits possible downtime to a minimum. It is therefore an object of the present invention to propose a floating wind turbines system.

Prior art patent application WO2006/121337 discloses a floating wind turbine installation for one floating wind turbine, comprising a long, submerged floating concrete cylinder that is ballasted. The individual anchor lines are each, at a certain distance from the floating cylinder at a fixing point on the individual anchor line, connected with double lines connected to the floating cylinder in a delta-shaped arrangement. This configuration is hence limited to single wind turbines for deep waters as this prominent feature, the ballasted concrete cylinder, makes the design unsuitable for shallower waters. The present invention proposes a system that is suitable for multiple wind turbines for deep and shallower waters.

Patent application US2008089746 discloses a floating platform for a single wind turbine that can be installed in shallow or deep waters. The platform is fixed in position using strong chains linked to heavy weights on the seabed. By changing the length of the chains, it can be installed at very different depths. The platform comprises a steel structure with six interconnected hollow steel pipes providing the necessary buoyancy required during sea transport, as well as during offshore operation. The wind turbine itself is located on a tubular steel tower on the platform. Once the platform with the fully assembled turbine has arrived at its destination, the assembly is temporarily ballasted. This extra ballast forces the platform down into the water and creates the free play necessary to hook the six chains attached to the counterweight to the platform. When the extra ballast is removed, buoyancy creates upward force whereby the chains get tensioned in order to provide some stability. In this configuration, the necessary buoyancy required for sea transportation is integrated in the platform for one single wind turbine.

Patent NL1008318 discloses a wind turbine island comprising several wind turbines equidistant one to the other and placed on a hub anchored to the sea bed by cables. Each wind turbine rotor is on the top of a pillar which are linked by horizontal concrete tubes and fastened to the hub by radial fixing cables. A drive mechanism rotates to bring the rotors into the wind. Nothing is mentioned about the installation method, which is a key point in designing a floating system that needs to be transported over the sea.

Patent WO2007/009464 which discloses a plant for exploiting wind energy at sea comprising several wind turbines which are installed on a structure comprising longitudinal beams, support means and anchoring means. The structure is also supplied with buoyancy elements provided with ballast, and the plant is adapted so that it can adjust depending on the direction of the wind. In this invention, the plant is a floatable structure, carried by the buoyancy of buoyancy elements or pontoons in the water. During towing, the complete buoyancy of the pontoons is used, hence during towing the plant is lying high in the water, with all beams above sea water level as well as most of the support structure. In this configuration the stability is very weak, the center of gravity is well above of the center of buoyancy and the structure is permanently menacing of tilting. The stability is obtained only once the plant is brought out to the production site, when buoyancy means are ballasted until there is obtained such a balance between buoyancy and mass.

Norwegian engineering consultancy company Force Technology has developed an offshore wind unmanned floating structure which is self-orientating towards the wind and, accommodates three wind turbines mounted at each corner of a floating triangular lattice-type welded steel foundation structure. The foundation structure is anchored to the seabed and can rotate as the wind changes direction. However, in such a configuration, wind turbines are too near one from the other and even if one is higher than the other, their efficiency will be limited and not optimal.

U.S. Pat. No. 6,294,844 discloses a weathervaning wind energy converter comprising wind turbines which are mounted in a frame provided with floating bodies and supporting means which are disposed some distance away from the plane of the wind turbines to keep it substantially vertically oriented. However, this overall costly and high construction with long blades, has an very high center of gravity which results in unstable behavior of the floating system in rough weather conditions.

Patent application WO02/073032 discloses an offshore floating wind power generation plant with single point mooring system fixing a floater to the sea floor, one or several wind power generation unit being placed on the floater. The float is always directed at a constant orientation to the wind, the plant being horizontally rotatable about the mooring point. In this configuration, the fatigue and stress applied on the electrical cable are important, as even if the structure is quite stable, the movement of the structure due to the wave and wind will have a large fatigue effect on the cable, especially at the connection point.

To increase the production and make the investment worthwhile, many existing designs of offshore wind turbines are using a single very large wind turbine generator. However, the installation, maintenance and repair of very large offshore wind turbines are very costly operations and are often depending on special designed, dedicated installation vessels.

It is a therefore an objective of the present invention to provide a floating system that ensure sufficient overall stability during sea transport, which can withstand the huge dynamic loads and acceleration forces imposed upon the structure in a floating transport mode when it is installed. It is another objective of the present invention to provide a cost effective solution and method with regard to maintenance and installation costs of a floating wind turbine system. It is another objective of the present invention to provide a system and installation method that combines well known and proven technologies from the offshore industry. It is also an objective of the present invention to provide a design for a floating offshore wind turbine system that avoids fatigue problems of the electricity cables.

The present invention provides a floating energy generating device that comprises at least two wind turbines mounted on a floating open structure, said floating open structure being moored to the seabed with a mooring system, each wind turbine featuring in operation mode a blade and rotor part mounted at the top of a tower and being connected via a cable to a central control power electronic unit on the floating open structure, the central control power unit being connected to a submerged high voltage power export cable for exporting the electricity generated by the at least two windmills, the floating open structure being connectable to or disconnectable from the mooring system and when disconnected from the mooring system the center of gravity of the floating open structure being at or below its center of buoyancy.

The present invention also provides an installation method for an offshore floating wind energy generating device according to the present invention.

The present invention further provides a cost effective solution for a wind energy converter system that ensures sufficient overall stability during sea transport. The use of multi smaller-scale offshore wind turbines is also a way to increase the production. Even if having more wind turbines can imply to have more often maintenance and reparation, these operations become far less costly. In fact, the production does not have to be stopped for the change-out of one wind turbine. Also the transport at sea is much easier as compared with a floater for a very big turbine, as several smaller ones provide for a center of gravity of the floater which is much lower than the center of gravity of one very large floating windmill. Hence the stability during transport and during operation is enhanced. The stability during transport can be enhanced by lowering even more the center of gravity, by ballasting the support structure, by the use of vertical axis windmills, or in the case of horizontal axis wind turbines, to transport them without the rotor and blades.

BRIEF DESCRIPTION OF THE DRAWINGS

Preferred embodiments of the invention are described hereunder with reference to the accompanying drawings, in which.

DETAILED DESCRIPTION OF THE FIGURES

Figure 1:
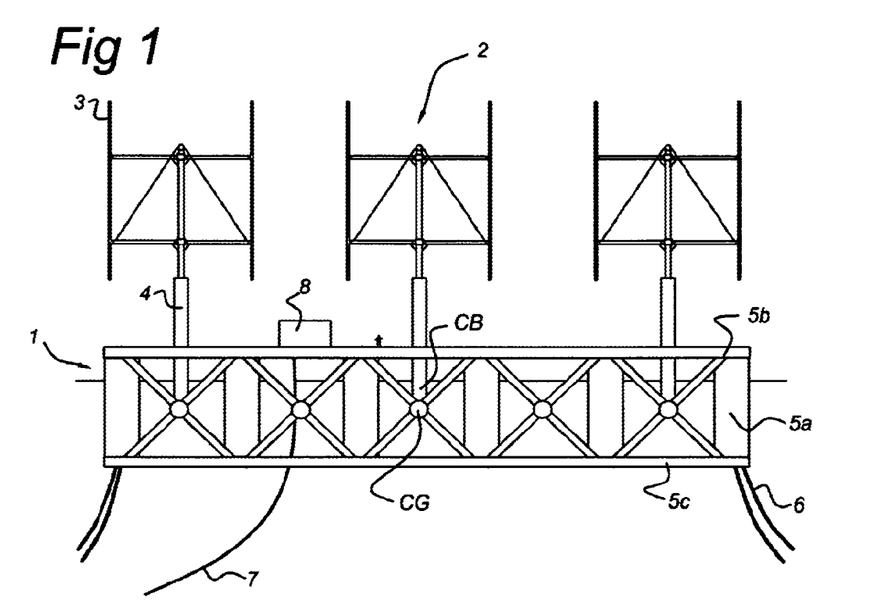
FIG. 1 shows a front view of a spread moored wind energy converter according to the present invention.
Figure 2:
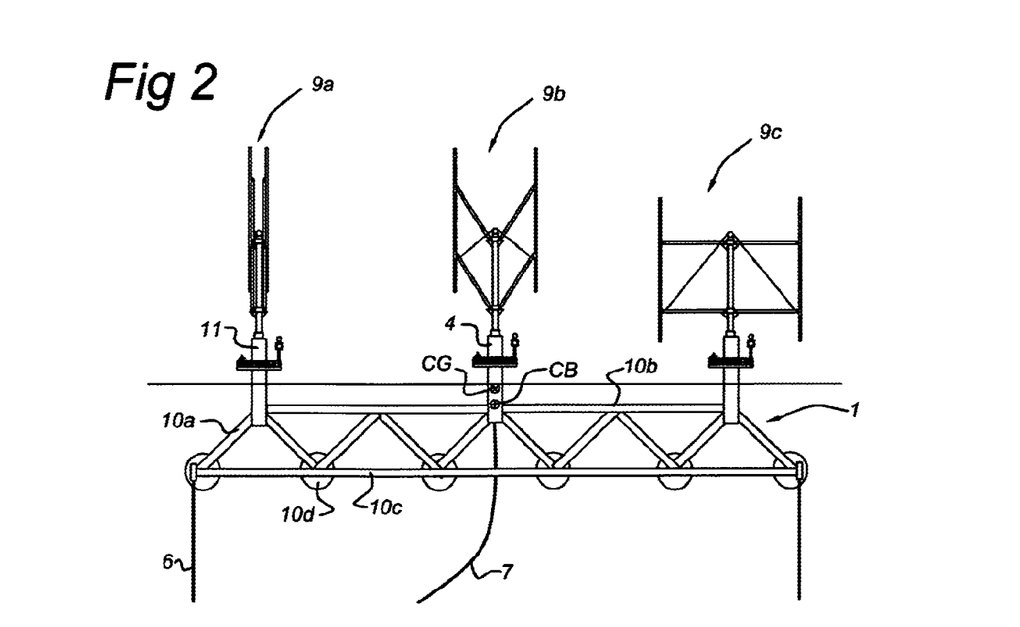
FIG. 2 shows a front view of a tendon moored wind energy converter according to the present invention which is provided with retractable blades.
Figure 3:
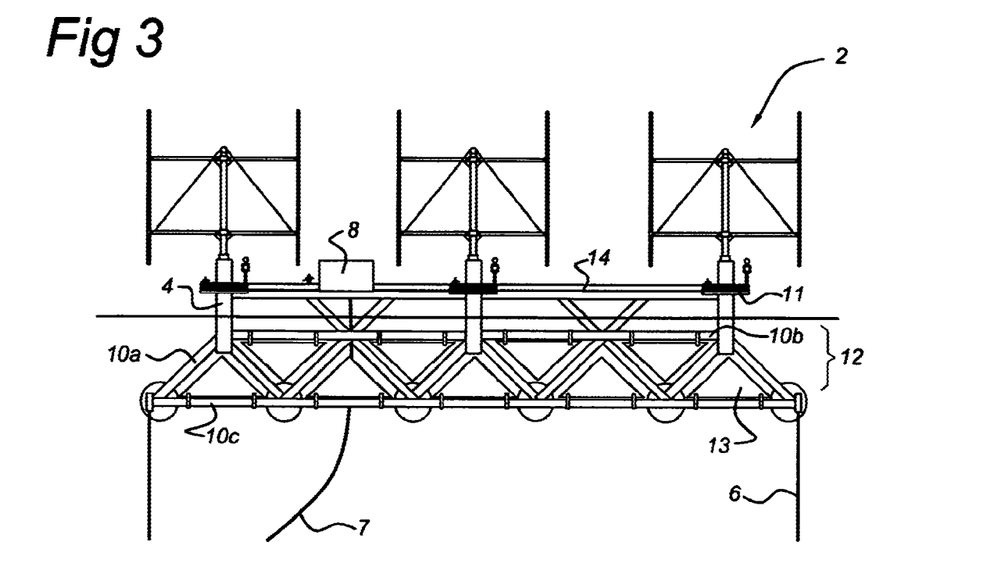
FIG. 3 shows a front view of a tendon moored wind energy converter according to the present invention, combined with a wave energy converter system

FIGS. 1 to 3 show similar offshore wind energy converters according the present invention. In each figure a floating open structure 1 supports three wind turbines 2, each wind turbines featuring a blade and rotor part 3 mounted at the top of a tower 4. The wind turbines 2 in this particular configuration are vertical axis windmills. The floating open structure 1 is an elongated floating body, the wind turbines 2 being mounted along the longitudinal axis of the floating open structure 1. The floating open structure 1 comprises a frame, made of horizontal and vertical hollow parts 5a, 5b and 5c. These hollow parts provide the necessary buoyancy required for stability during sea transport, as well as during offshore operation. Some of the hollow parts can be ballastable with seawater so to adjust the buoyancy of floating open structure. These features are possible ways to lower the center of gravity and enhanced the stability during transport and installation. Further in the embodiment described in FIGS. 1 to 3, the floating open structure 1 is connected to a single submerged high voltage power export cable 7 for collecting the power generated by the wind turbines and transforming the power before exporting the electricity generated by the wind turbines 2 via the power export line. The export cable 7 is connected to the floating open structure 1 via a single control power electronic unit 8.

In the particular embodiment shown in FIG. 1, the floating open structure 1 is moored to the seabed with catenary mooring lines 6 attached at both extremities of the longitudinal axis of the floating open structure 1. The horizontal upper hollow part 5h provides a platform enabling personnel to circulate and have an easy access to the wind turbines towers and the control power electronic unit for inspection, maintenance, etc.

In FIG. 2, the vertical axis wind turbines are retractable (or foldable, not shown) and shown in different states: a completely retracted state 9a, an intermediate opening state 9b and a completely open state 9c. In FIG. 2, the floating open structure 1 comprises a lighter frame than the one shown in FIG. 1. It has tubes 10a interconnecting horizontal upper and lower tubes 10b and 10c with horizontal tubes 10d which are arranged at right angles to the longitudinal axis of the floating unit 1. The floating open structure 1 is moored to the seabed with tensioned mooring lines or tendons 6 attached at both extremities of the longitudinal ends of the floating open structure 1. In this operative and moored configuration, the center of gravity can be low and can be under, at or even above the center of buoyancy.

In this embodiment, the access 11 by personnel to the wind turbines for maintenance and inspection is provided on each tower part 4 and the single control power electronic unit is integrated in one of the wind turbines tower 4.

In the embodiment shown in FIG. 3, the floating open structure 1 is also moored to the seabed with tensioned mooring lines or tendons 6 attached at the corners of the floating open structure 1. In this particular embodiment, the floating open structure 1 supports a submerged wave power generating system 12 composed of submerged pivoting panels 13 that collects energy from passing wave pressure fronts by tilting or rotating motion within the frame formed by interconnecting tubes 10a, 10b and 10c. The power produced is exported to the single control power electronic unit 8 that collects also the electricity produced by the wind turbines 2. The produced electricity is then being transferred to users and/or to shore via an export cable 7.

Figure 4:
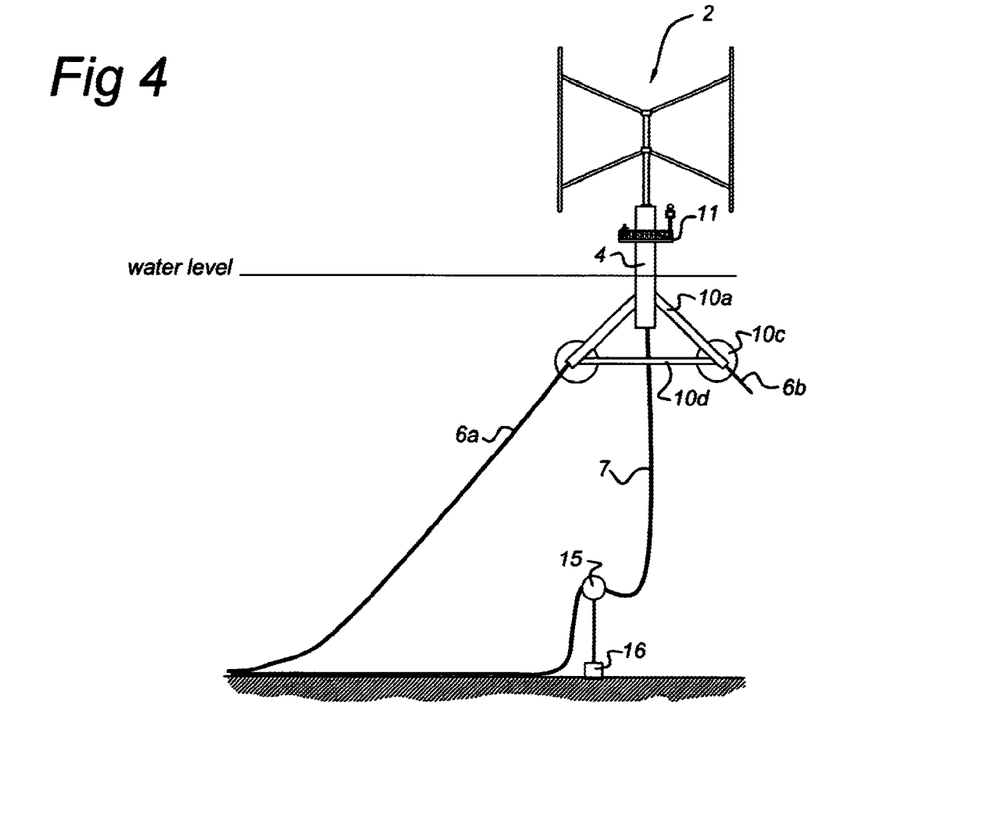
FIG. 4 shows a side view of catenary spread moored wind energy converter system according to the present invention.
Figure 5:
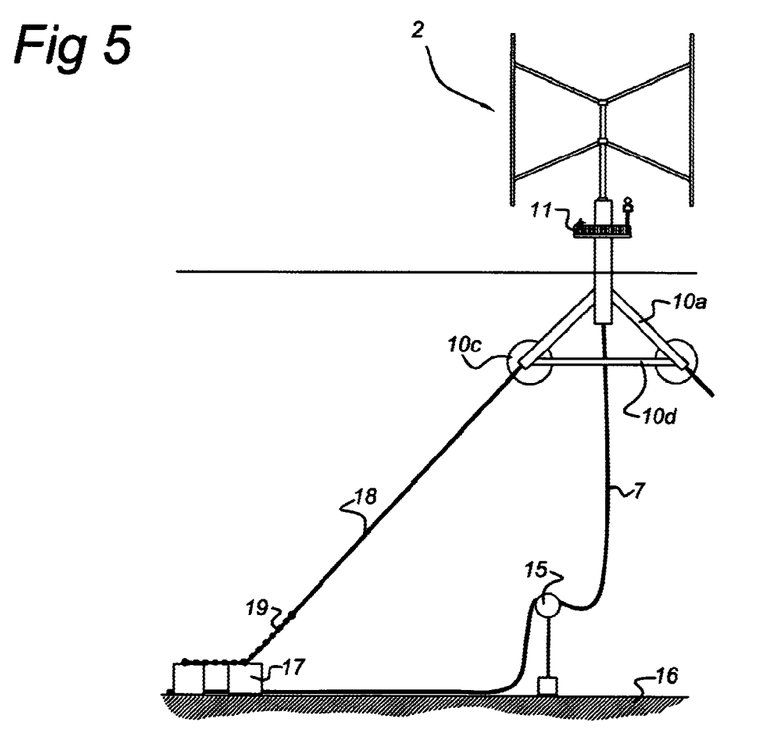
FIG. 5 shows a side view of semi-taut moored wind energy converter according to the present invention.
Figure 6:
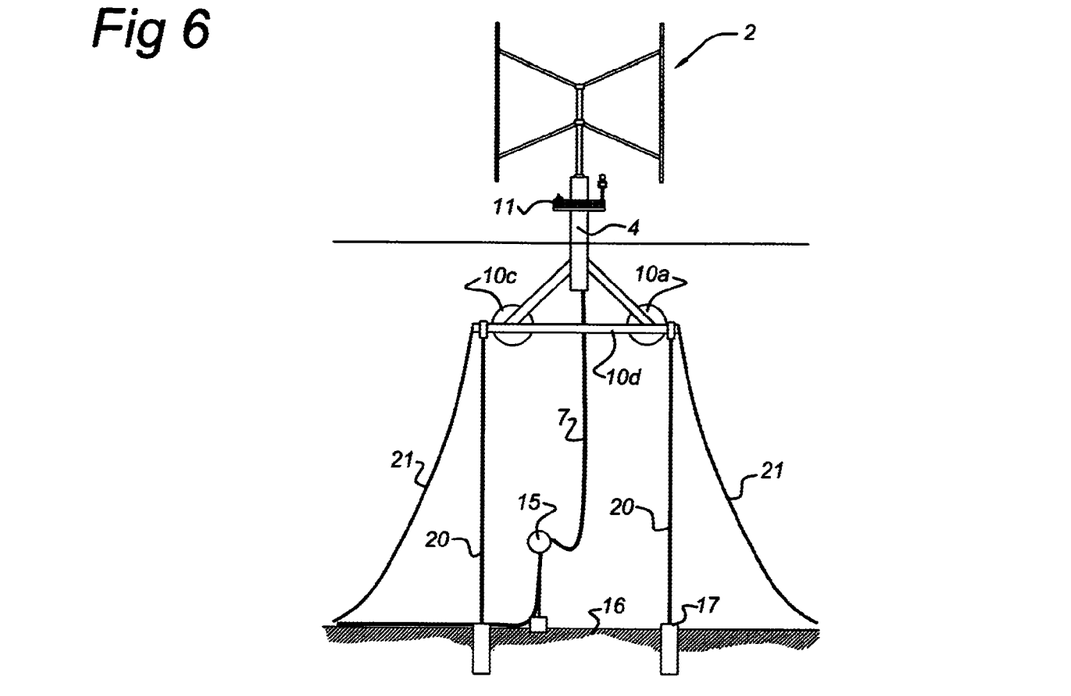
FIG. 6 shows a side view of a tendon moored wind energy converter according the present invention.

In FIGS. 4 to 6 the offshore wind energy converters are identical to the ones described in FIGS. 1 to 3. In these Figures, different mooring systems are shown. FIG. 4 shows for example a side view of a wind energy converter according to the present invention. Two catenary mooring lines 6a and 6b are attached to the shown extremity of the floating open structure 1.

The export electricity cable 7 has a "lazy S" configuration as it extends toward the sea bottom via an intermediate buoy 15 which is anchored to the seabed. From the intermediate buoy 15 the export cable 7 stretches in a gentle curve toward the sea bottom 16. This configuration enables to decouple the part of the electricity cable 7 that lies on or into the seabed from the movement of the floating open structure 1 due to waves and wind.

Figure 4A:
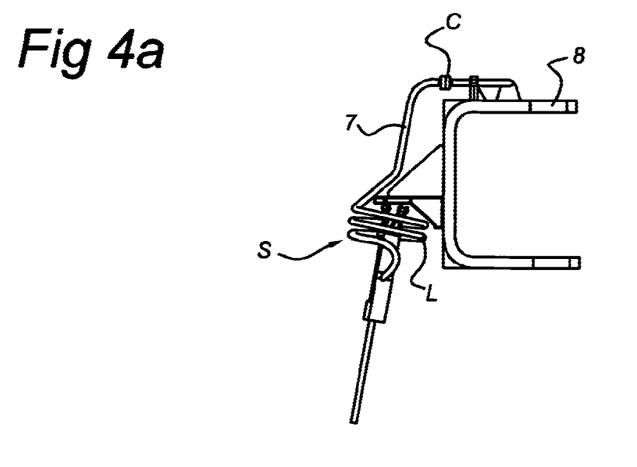
FIG. 4a shows a detail of the connection between the structure of the wind energy converter and an export electricity cable.

Another option to reduce the electricity cable 7 fatigue is shown in FIG. 4a representing a detail of FIG. 4, FIG. 5 or FIG. 6. The connection point C between the submerged electricity cable 7 and the onboard cable leading to the power electronic unit 8 on the floating structure 1 represents a important point submitted to a lot of stress and fatigue. The floating open structure 1, even if very stable, moves around its mean design position due to surge, sway and heave and changes its angular orientation with regard to its mean position as well, due to pitch, roll and yaw. This is why the said relative angular floating unit/electricity cable offsets can result in high bending loads and stress while the transitional and combined translational and angular offsets can result in high variations in the effective tensions at the cable hang-offs. In order to decouple the movements of the floating open structure 1, the cable itself could have multi-spool design or can be guided through a tube which has a multi-spool shape. The spools S can form continuous or segmented lines, arranged in loops and/or spirals L, so that any bending of the top part of the electricity cable 7 is transformed mostly in torsion in the spools S. If necessary a bend restrictor can be used in addition in the part of the hanging cable 7 directly under the multi-spool.

In FIG. 5, the wind energy converter is (semi-) taut moored to the seabed via inclined taut mooring lines 18. The taut mooring lines 18 are composed of cable (steel or synthetic fibers) for the major part of the water column and is provided with a heavy chain 19 near the sea bed. The anchors 17 used can be of different type such as vertically loaded anchors, gravity anchors, suction piles, driven piles etc. . . .

In FIG. 6, the wind energy converter is taut moored to the seabed via vertical taut mooring lines or tendons 20. The mooring system can be provided with additional lateral catenary mooring lines 21 which reduce the lateral displacement of keep the wind energy converter due to strong winds and/or currents. The anchors 17 used can be of different type such as vertically loaded anchors, gravity anchors, suction piles, driven piles etc. . . .

Figure 7:
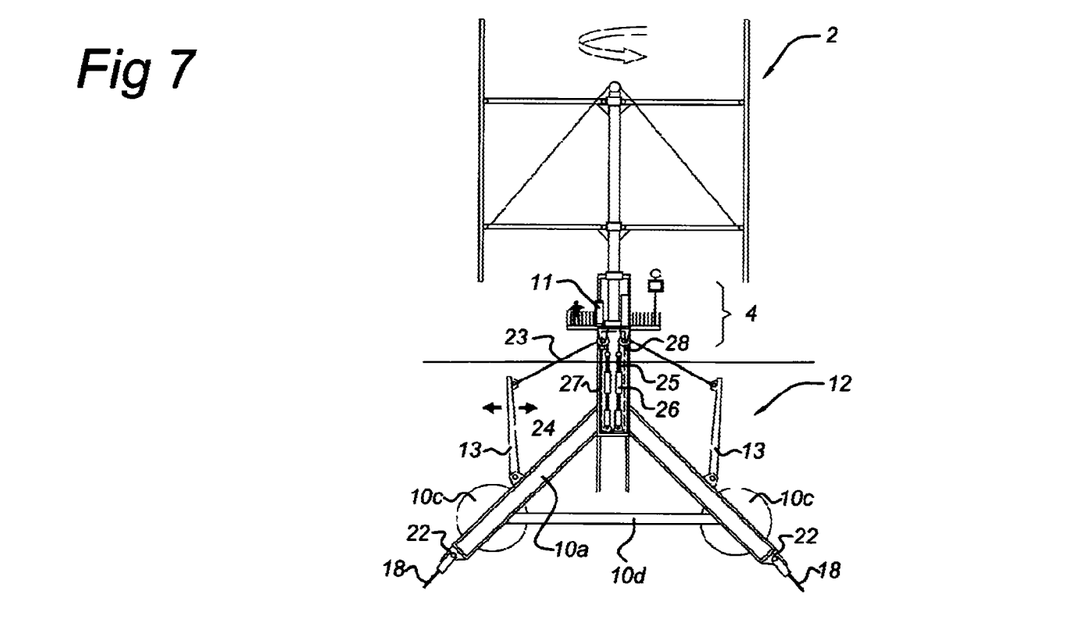
FIG. 7 shows a detailed sectional view of the power take of system of the embodiment shown in FIG. 3.

FIG. 7 shows a detailed sectional view of the power take of system of the embodiment shown in FIG. 3 where the wind energy converter is coupled with a wave energy converter. The configuration of the wind energy converter is similar to the ones described in the previous figures. In FIG. 7, the detailed extremity of the floating open structure 1 is composed of cylindrical hollow elements 10a, 10c and 10d, with tensioned mooring lines 6 connected to the lower part 22 of the cylindrical elements 10a. In this particular embodiment the wind energy converter is taut moored to the seabed via inclined taut mooring lines 18. At the other extremity of the floating open structure 1, there is an identical configuration. In each wind turbine tower 4 an easy access 11 is provided above surface water. Attached to the frame are two submerged pivoting panels 13, one on each side. These pivoting panels 13 are placed in a wave active depth for optimal collection of wave energy. In FIG. 7, one extremity of the panels are pivotingly attached to the frame of the floating open structure 1, the other extremity being connected via a rod or cable 23 to the control mechanism or power take off system 24 located in the tower 4 of the wind turbine 2. In the present embodiment, the power take off system 24 is using the extension of the cable 23 under wave loads. When pivoting under the waves' action, the panels 13 will tension the cable 23, that passes via a sprocket 28, which then activates the power take off cable 25 connected to the linear generator 27. The power take off system 24 can also be used as an actuator to control and optimize power production (several known control techniques may be used, such as reactive control, phase control, latching). It may use a combination of different systems such as electromechanical system, electro active polymers system, hydraulic system, mechanical system or piezo-electric system (this list being non-limitative). Cable 13 and power take off cable 25 can be made of stretchable synthetic material (SSM), such as electro active polymers (EAP) which generate electricity when the distance between their ends changes, as when they are stretched. Electricity produced by both the wind turbine and the wave power generator unit is transferred via the central power control unit to the electricity export cable.

FIGS. 8 to 12 shows wind energy converters that are via a pivoting arm connected to their mooring systems, each wind energy converter being able to weathervane.

Figure 8:
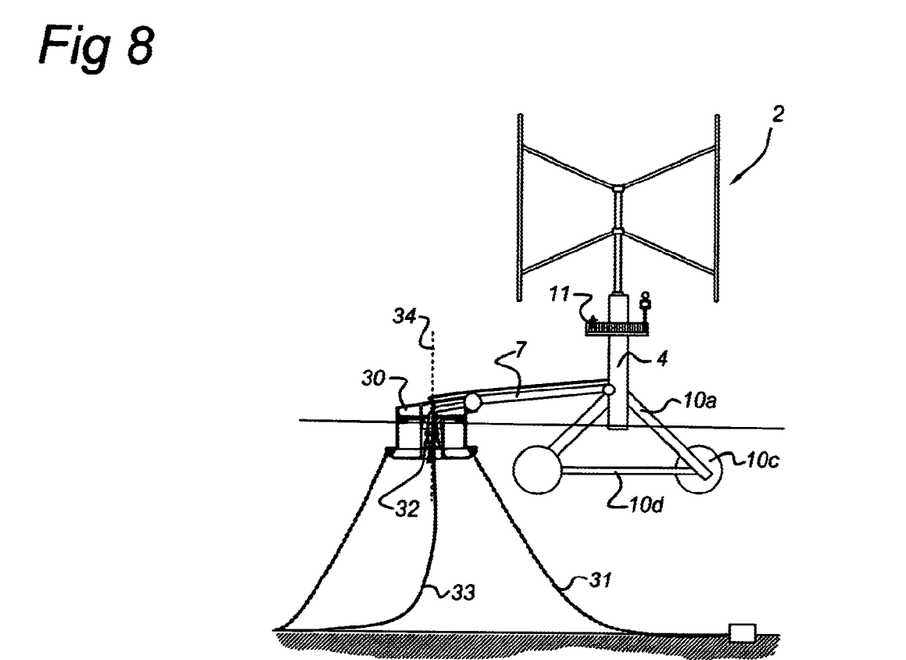
FIG. 8 shows a side view of a weathervaning wind energy converter according to the present invention.

FIG. 8 shows a wind energy converter as described in FIG. 4. The only difference is concerning the mooring system. In this embodiment, a rigid arm 29 connects the wind energy converter to a single floating mooring buoy 30 anchored by several mooring lines or chains 31 extending in catenary curves from the buoy 30 to the seabed. The rigid arm 29 is a rigid pivoting connecting yoke that makes a mechanical connection between the floating open structure 1 and the mooring buoy 30. The mooring buoy 30 in this particular embodiment is a CALM buoy type of buoy having on its rotation axis 34 a central electrical swivel 32, the stator being connected the submerged electricity export cable 33 and the rotor being via an electricity cable 7 connected to the power electronic unit 8 on the floating open structure 1.

Figure 9:
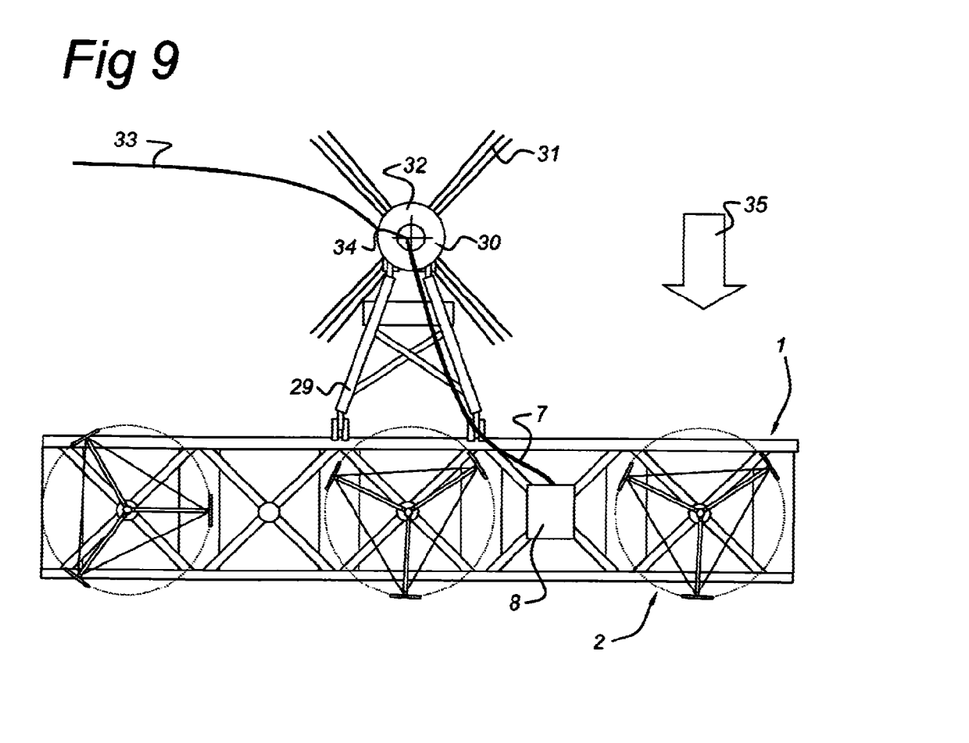
FIG. 9 shows a top view of the wind energy converter shown in FIG. 8.

FIG. 9 is a top view of the embodiment shown in FIG. 8. The mooring buoy 30 in this particular embodiment is provided with grouped mooring lines 31 which can be for example a 3×2, 3×3 or 3×4 mooring line arrangement. In each group there is at least one mooring line for redundancy reasons in case a mooring line breaks. The electricity cable 7 is going from the control power electronic unit 8 to the central swivel 32 in the space between two groups of mooring lines. In this figure, the wind direction is shown by the arrow 35; all wind turbines 2 mounted on the floating open structure 1 are positioned downwind with regards to the weathervaning point 34 of the mooring system 30.

Figure 10:
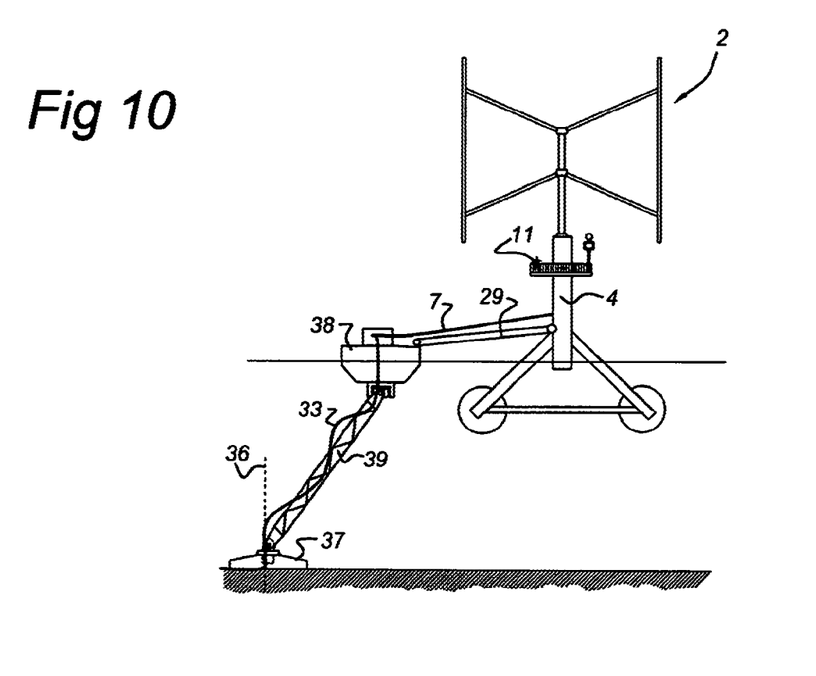
FIGS. 10 to 12 show side views of alternative embodiments of the weathervaning wind energy converter design shown in FIG. 8.
Figure 11:
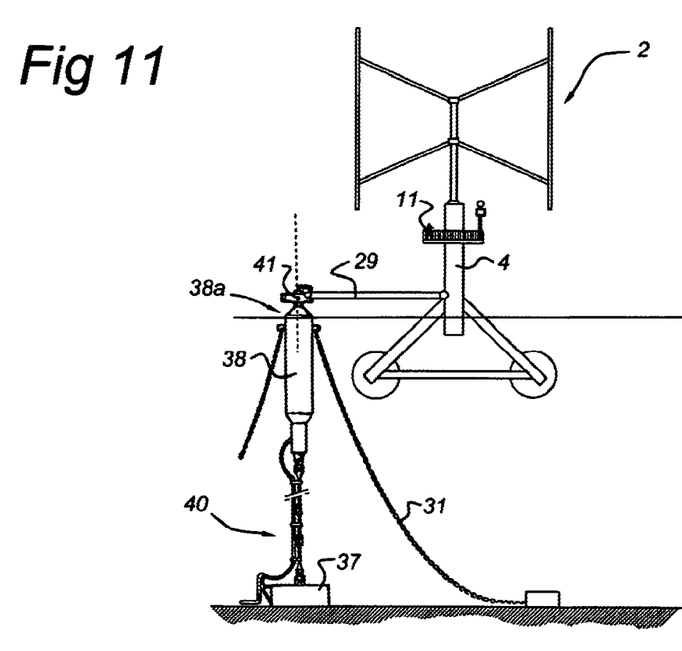

FIGS. 10 and 11 show other embodiments for the mooring systems. In FIG. 10, a pivoting rigid truss arm 39 is connecting a sea based part 37 and a sea surface part 38. The rigid truss arm 39 is rotating around the central axis 36 of the sea based part 37. The sea surface part 38 is connected to the floating open structure 1 of the wind energy converter via a rigid pivoting connecting yoke 29. The electricity cable 7 is going from the control power electronic unit 8 to the central electrical swivel at the sea surface part 38 of the mooring system. The export cable 33 is supported by the rigid truss arm 39 from the sea surface part 38 to the seabed.

In FIG. 11 the mooring system is also provided with lateral mooring chains 31 creating a restoring force when the floating open structure is displaced laterally. Cables, chains or tubes 40 connect a sea based part mooring point 37 and a sea surface part 38. The sea surface part 38 has a vertical elongated shape with connections for the lateral mooring lines 31. Above water level part 38*a* is connected to a rigid pivoting connecting yoke 29 in a weathervaning connection point 4 on which an electrical swivel is placed.

Figure 12:
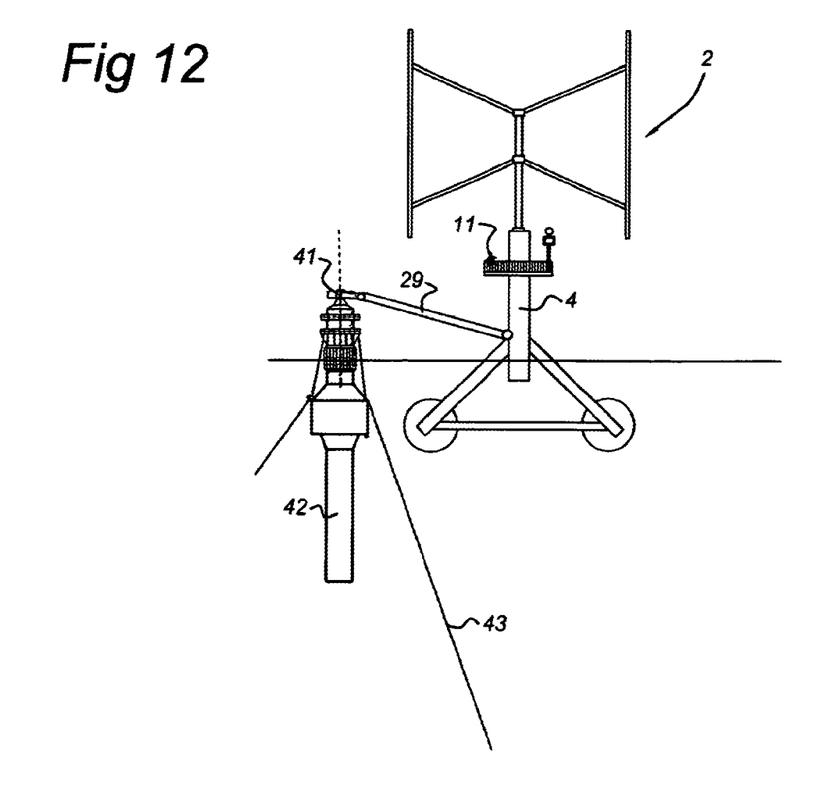

FIG. 12 shows an embodiment where the mooring system is a spar type system for can deep water environments. The wind energy converter is via a rigid pivoting connecting yoke 29 attached to a deep draft and vertical single column floating unit 42 being taut moored to the seabed via cables 43. As shown in the previous embodiment, the part of the mooring system above water level has a weathervaning connection point 41, where the rigid pivoting connecting yoke 29 is attached.

According to the present invention many well known and proven technology in the mooring systems domain can be used to moor a wind energy converter comprising several small scale wind turbines and having a configuration enhancing the stability of the overall structure by keeping the center of gravity as low as possible when in operation. Further, the floating open structure of the wind energy converter is adaptable to any kind of windmills, even if only vertical axis wind turbines were shown, the invention is not limited to the use of such windmills, upwind or downwind horizontal axis windmills, different types of wind turbines with different shape of blades or length, or type of generators, a different tower design, height can be adapted to the floating open structure according to the invention. It should also be noticed that the weathervaning system can be either a semi- or fully weathervaning system. Using well proven technology and smaller scale wind turbines provide important advantages as already mentioned, but other factors can still improve the device and still reduce the overall costs It is therefore also an objective of the present invention to provide an installation method for an offshore floating wind energy generating device according to the present invention. The installation costs of such a device is a major issue, especially when the total cost over its life time are taken into account including transportation for repair and maintenance purposes. It is an objective of the present invention to provide a stability of the structure during offshore transportation. According to the invention the floating open structure is provided with means to lower the center of gravity and/or raise the center of buoyancy during transport, for example via ballast tanks which are ballasted during transport mode or adding temporary buoyancy elements. Hence, the center of gravity of the floating open structure can be placed below the center of buoyancy which is ideal for the stability during transport at sea. According to the invention the overall offshore installation cost are further reduced by using for example pre-installed mooring lines, a pre-installed electricity grid, providing easy access to installation and maintenance vessels, etc.

Figure 13:
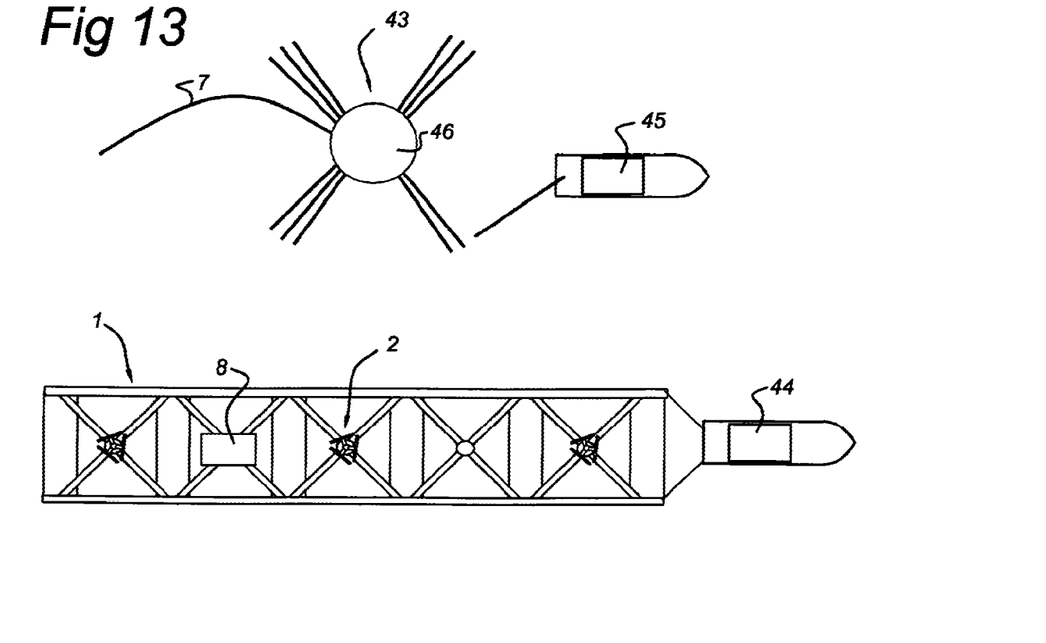
FIGS. 13 and 14 are showing the different steps of the installation of a spread moored wind energy converter according to the present invention.
Figure 14:
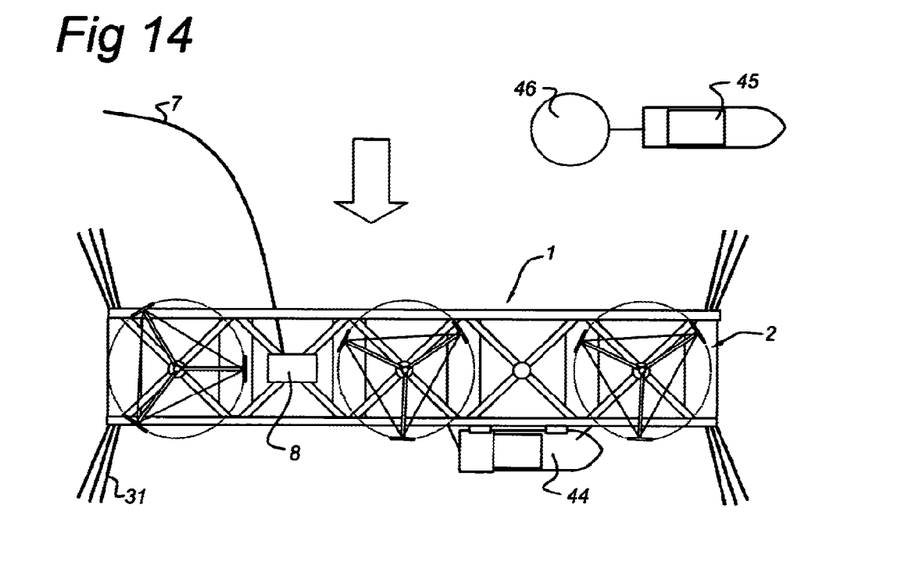

FIGS. 13 to 14 shows different steps of the installation of a spread moored floating wind energy converter according the invention.

FIG. 13 shows that the mooring lines of the mooring system 43 are pre-installed before the floating open structure 1 has arrived on site and before it is connected to the mooring system It represents also a situation where the open floating structure is disconnected from the mooring system and towed to shore for maintenance and repair purposes. In FIG. 13 a conventional, non-dedicated tugboat 44 tows a floating open structure 1 on which three wind turbines 2 are mounted. The blades of the wind turbines are folded or retracted during transport at sea. The mooring system 43 is (temporary) attached to a temporary buoy 46 so that it is independent floating when it is not connected to the floating open structure 1. Another non-dedicated tugboat or installation vessel 45, is used to install the mooring lines 31, by disconnecting them from the temporary buoyant structure 46, bring them to the floating open structure 1 and connect them to it (or reverse when the floating structure is disconnected from its mooring system for maintenance on shore). As well as for the mooring lines of the mooring system, the export cable 7 is pre-installed before arrival and connection of the floating open structure 1 and can be connected to the temporary buoy 46 as well.

Once the floating open structure is moored via the mooring system to the seabed and the export cable 7 connected to the single power electronic unit 8, the wind turbines are prepared for operation by expanding or unfolding them (or adding the wind turbine blades, in the case of horizontal axis windmills). The non-dedicated tugboat or installation vessel 45 tows the temporary buoy 46 back to shore. The non-dedicated tugboat 44 or any maintenance vessel, can moor itself to the floating open structure 1, preferable downwind of the wind turbines, in a more protective landing area.

Figure 15:
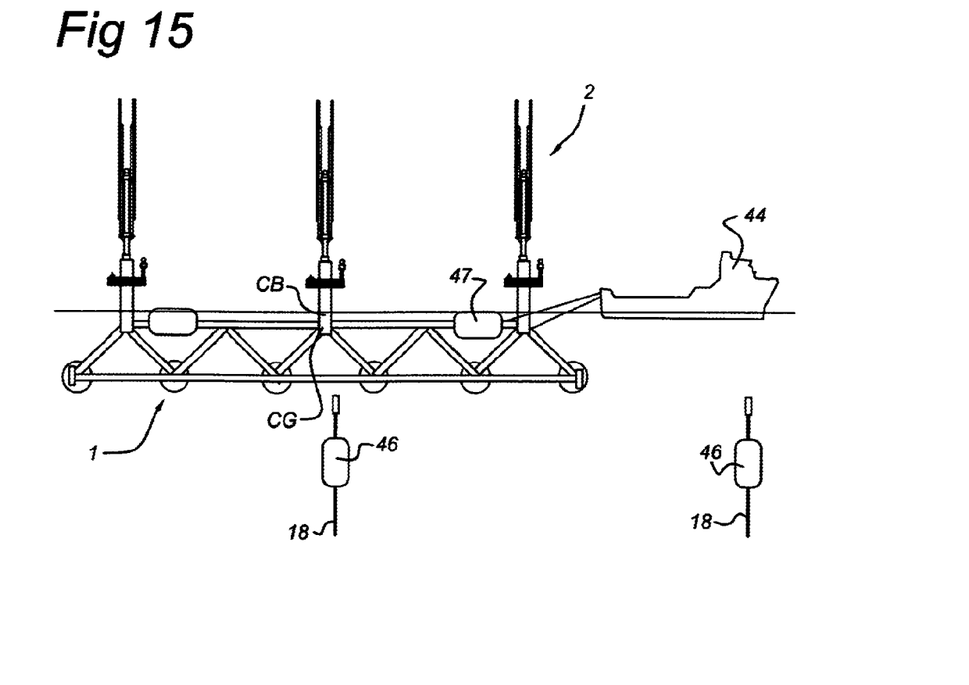
FIG. 15 shows one step of the installation of a tendon moored wind energy converter according to the present invention

FIG. 15 shows a step of the installation of a tendon moored floating wind energy converter. The method of towing on site the floating open structure is very similar to the one described in FIG. 13. If the floating open structure 1 is not ballastable or not stable enough, temporary buoyancy elements 47 can be added to raise the center of buoyancy with regard to the center of gravity during transportation mode. Also the mooring system can be provided with temporary buoyancy elements 46 to keep it floating when the floating open structure 1 is not connected to it. Hence, during transportation of the floating open structure the center of gravity is kept as low as possible to enhance the stability of the overall structure. The floating open structure 1 can be ballasted during transport and/or hook-up mode, and can be partly or fully de-ballasted in operation mode. The complete installation comprises the following steps:

- pre-install on the offshore site the mooring lines of a tendon mooring system, the vertically oriented tendons being provided with temporary buoyancy
- tow to site the ballasted floating open structure 1 with wind turbines 2,
- connect the floating open structure 1 to the pre-installed mooring tendons 18 of the mooring system and exerting a tensioning force on the connected tendons by de-ballasting the floating open structure 1,
- retrieving the temporary buoyancy from the tendons,
- prepare each wind turbine 2 for operation mode by expanding, unfolding or adding the wind turbine blades.

FIGS. 16 to 19 show different steps of the installation of a weathervaning floating wind energy converter according the invention.

Figure 16:
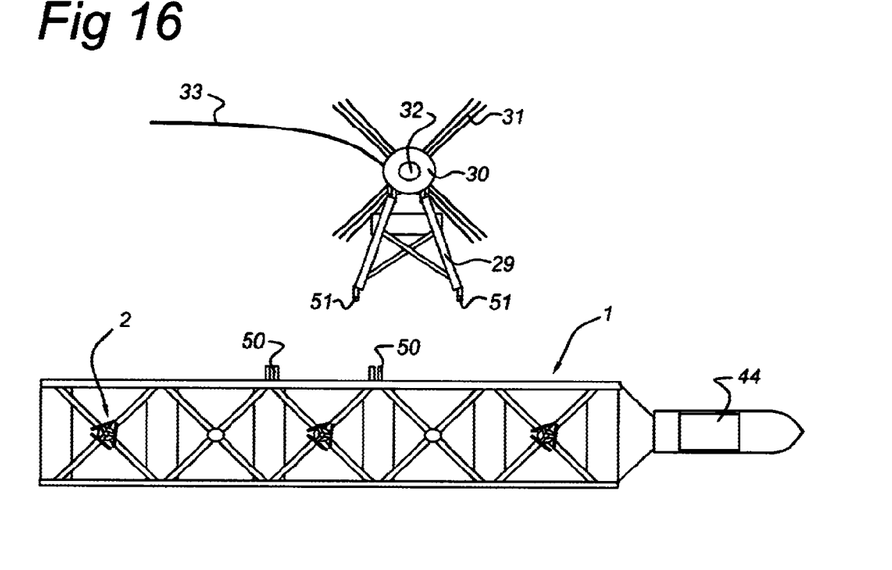
FIGS. 16 to 19 show different steps of the installation of a weathervaning wind energy converter according to the present invention.
Figure 17:
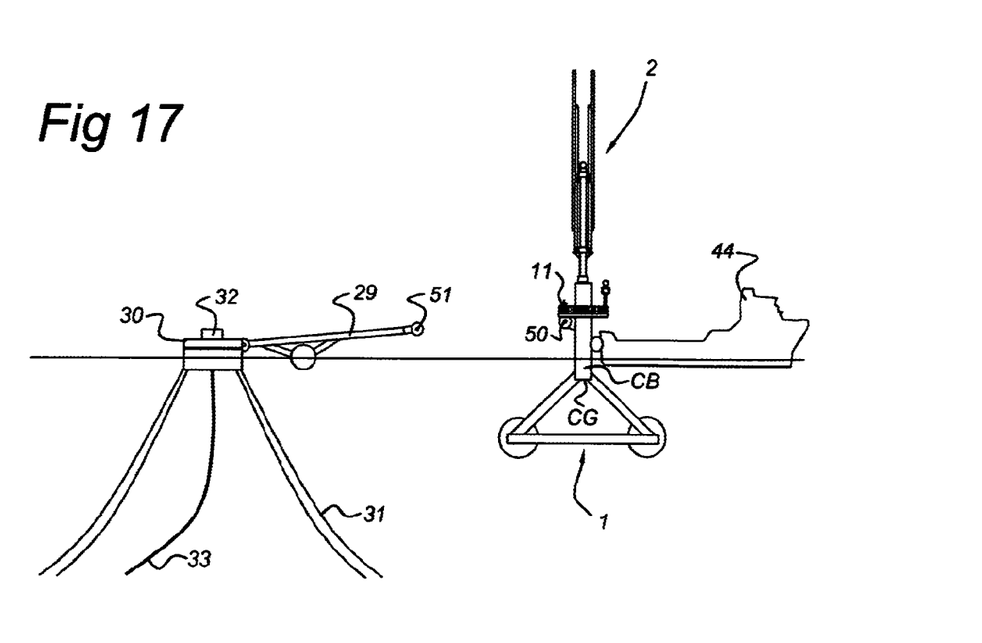
Figure 18:
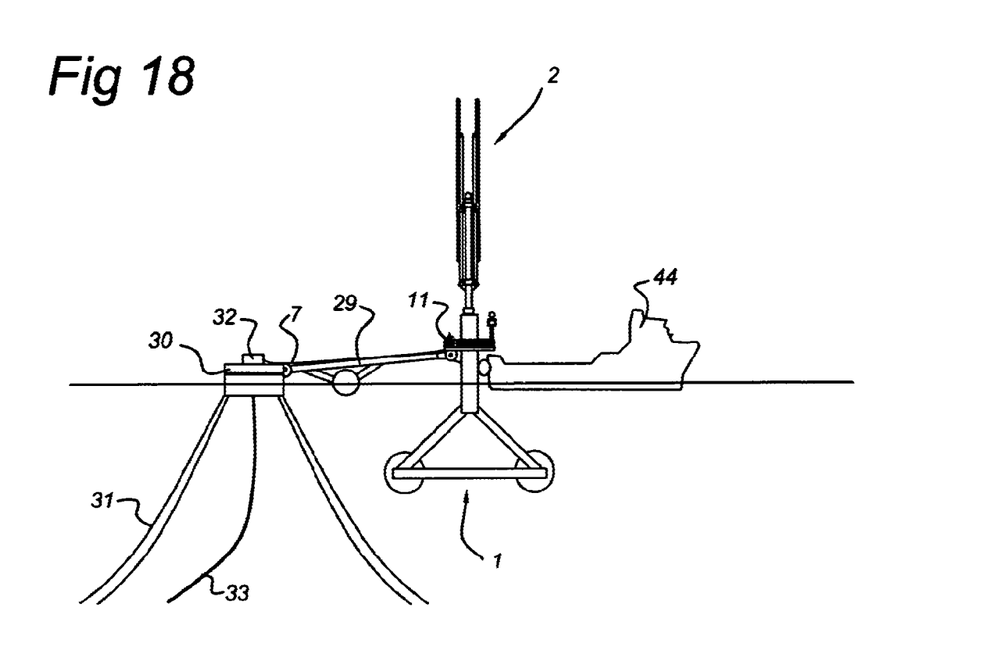
Figure 19:
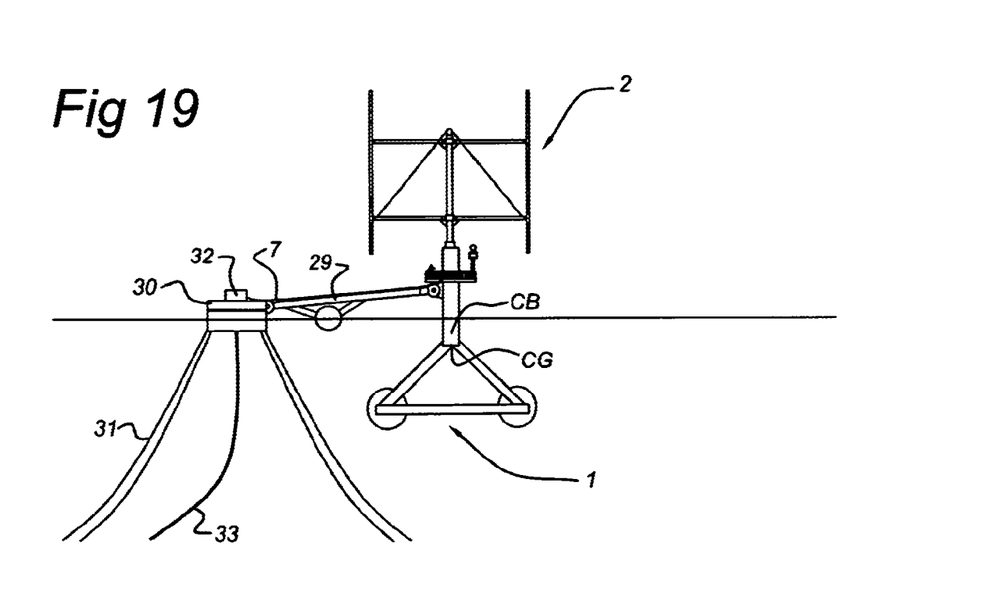

FIG. 16 shows a top view of the system just when the mooring system is not connected to the floating open structure, for example during installation on site of the floating open structure 1. It is shown that the mooring system includes a pivoting connecting yoke 29 and a mooring buoy 30 which is anchored to the sea-bed with anchor points and catenary shaped anchor lines 31. In an alternative embodiment (not shown) the yoke is part of the floating open structure and not part of the mooring system. The installation method comprises the following steps:

- pre-install a single-point mooring system comprising a buoy 30 anchored to the sea-bed with anchor points and catenary shaped anchor lines 31, and a turntable on which an electrical swivel is placed and to which a pivoting connecting yoke 29 is attached, the export cable 33 being already preinstalled as well.
- towing the floating open structure with wind turbines 2 to site,
- positioning the connector points 50 of the floating open structure face to face with to the connection points 51 of the rigid pivoting connecting yoke and make a mechanical connection between the floating open structure 1 and the preinstalled mooring system with the help of a tugboat 44 as shown in FIGS. 17 and 18.
- create an electrical connection between an electricity cable 7 of the wind turbine and the electricity export cable 33 via the electrical swivel (as shown in FIG. 19).

One of the main advantages of the system and method according to the present invention is that the system being disconnectable, the floating open structure with wind turbines can be disconnected from the mooring system and be towed to shore for repair and maintenance purposes. Hence, a first floating open structure with wind turbines can be disconnected from the mooring system and tow to shore and being replaced by a second floating open structure with wind turbines connectable to the mooring system so reduce the overall off-power time, while maintenance or repair is done at the first floating open structure.

Another advantage is that it is possible to stop and repair a single wind turbine while the other wind turbines on the floating open structure 1 are kept in full operation. Hence, the removal and replacement of a blade and rotor part mounted at the top of a tower of a single wind turbine do not imply to stop the production.

Figure 20:
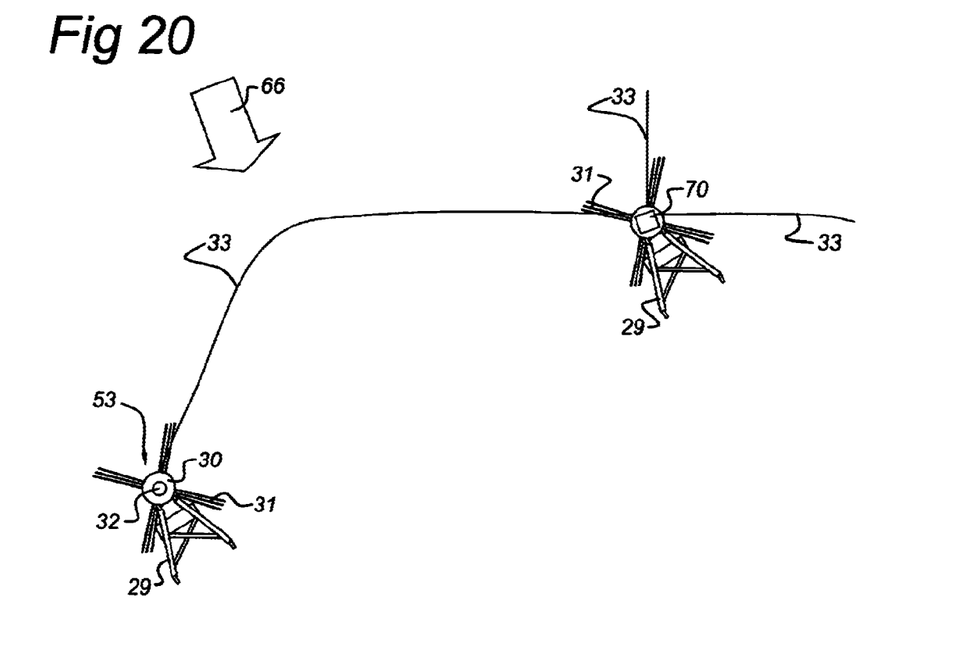
FIGS. 20 and 21 shows the installation of an offshore wind farm of wind energy converters, according to the present invention.
Figure 21:
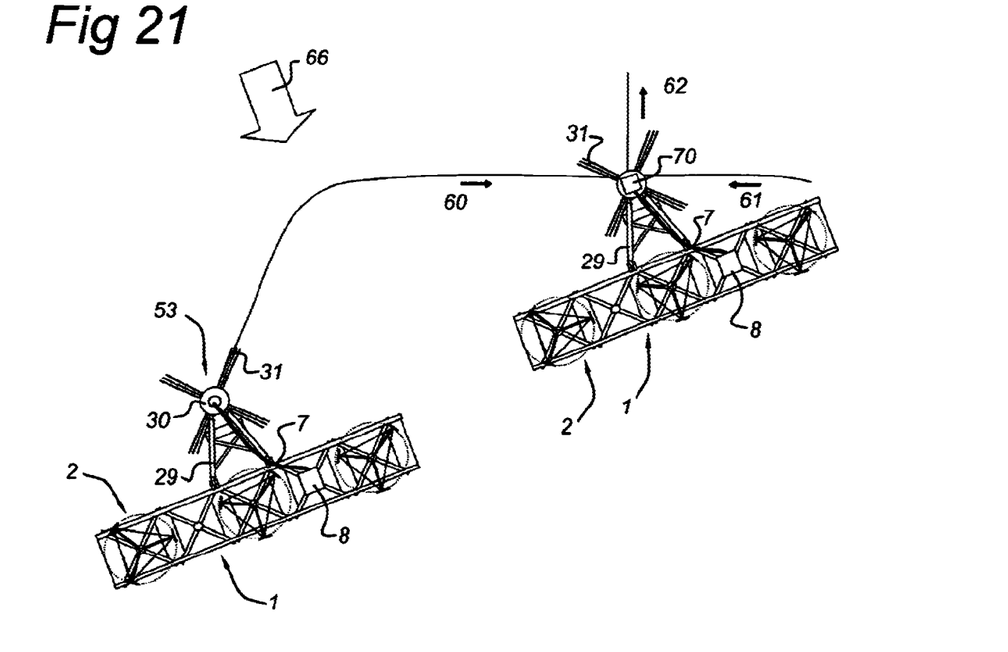

FIGS. 20 and 21 shows the installation of a farm of wind energy converters according to the present invention. The principle is the same as what has been described for a single floating open structure. The mooring systems are pre-installed as well as an export cable 33 interconnecting each pre-installed mooring system. In the particular embodiment shown in FIGS. 20 and 21, the pre-installed single-point mooring systems 53 comprise a buoy 30 anchored to the sea-bed with anchor points and catenary shaped anchor lines 31, and a turntable on which an electrical swivel 32 is placed and to which a pivoting connecting yoke 29 is attached.

In FIG. 21, multiple floating open structures 1 connected to the mooring buoys 30 are shown. The wind direction is indicated with the arrow 66, and as all wind turbine systems are placed downwind with regard to their weathervaning mooring system 53, the wind turbines are placed perpendicular to the wind direction which is the optimal position.

An electricity cable 7 has been installed between each floating open structure and each electrical swivel 32. The produced electricity is sent to a central power transformer unit 70 as indicated by arrows 60, 61 and 62. The central power transformer unit 70 transforms the collected produced electricity from multiple wind energy converter systems and sent it in the most efficient way (AC or DC, depending of the length of the export cable) to the grid or to shore.

According to the present invention, a wind energy converter device is provided which device is given high stability during transport at sea and during operation. It is adaptable to all sorts of wind turbines, and moored to the seabed via well known and proven mooring systems which can be all advantageous depending on the environmental conditions and water depth of the site. The installation method proposed in this patent application, reduces the critical path of the installation procedure and reduces the overall cost.

Embodiments of an offshore floating energy generating device relate to:

A floating energy generating device wherein in that the floating open structure is provided with additional buoyancy means during transport mode;

A floating energy generating device wherein that the floating open structure is an elongated structure that is adaptable to any kind of windmills;

A floating energy generating wherein that the at least two wind turbines are vertical axis windmills;

A floating energy generating device as claimed in any preceding claims, wherein a single wind turbine can be stopped and repaired while the other wind turbines on the floating open structure are kept in full operation;
A floating energy generating device wherein that the floating open structure allows for the removal and replacement of a blade and rotor part mounted at the top of a tower of a single;
A floating energy generating device as claimed in any preceding claims, characterized in that the mooring system is installed before the floating open structure is connected to the mooring structure;
A floating energy generating device as claimed in any preceding claims, wherein the floating open structure with wind turbines can be disconnected from the mooring system and be towed to shore for repair and maintenance purposes;
A floating energy generating device wherein that a first floating open structure with wind turbines can be disconnected from the mooring system and a second floating open structure with wind turbines can be connected to the mooring system;
A floating energy generating device wherein the mooring system is provided with additional mooring lines for redundancy;
A floating energy generating device wherein the mooring system is provided with buoyancy so that it is independent floating when it is not connected to the floating open structure;
A floating energy generating device wherein that the at least two wind turbines mounted on the floating open structure are positioned downwind with regards to the weathervaning point of the mooring system;
A floating energy generating device, the wave power generating system being a submerged pivoting panel that collects energy from passing wave pressure fronts by tilting or rotating motion within the frame, the panel being connected to a power take off system that convert the wave motion into electricity.

Method for installation of an offshore floating energy generating device wherein the export cables are also preinstalled before arrival and connection of the floating open structure.

Method for installation of an offshore floating energy generating device, in which the electricity export cables are preinstalled before connecting the floating open structure to the mooring system.

Method for installation of an offshore floating energy generating device, in which the each wind turbine are prepared for operation by unfolding or adding the wind turbine blades after the floating open structure is connected to the mooring system.

Method for installation of an offshore floating energy generating device, of claim 26-30, wherein that temporary buoyancy elements are added to the floating open structure an/or the mooring system during offshore transportation to the installation site.

Method for installation of an offshore floating energy generating device, wherein an installed floating open structure is disconnected from the mooring structure and is towed to shore for repair and maintenance purposes.

Method for installation of an offshore floating energy generating device, wherein an installed floating open structure is disconnected from the mooring structure and is towed to shore for repair and maintenance purposes and being replaced by a second floating open structure connectable to the mooring system.

Method for installation of floating energy generating device, wherein the mooring lines are lines of a spread mooring system, comprising the steps of preinstalling on the offshore site electricity export cable, tow to site the floating open structure with at least two windmills, connect the floating open structure to the pre-installed mooring lines of the mooring system and electricity export cable, prepare each wind turbine for operation mode by unfolding or adding the wind turbine blades.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:
1. A floating energy generating device comprising:
at least two wind turbines mounted on a floating open structure comprising a frame of submerged interconnected hollow tubes being moored to the seabed via a mooring system,
each wind turbine featuring, in operation mode, a blade and rotor part mounted at the top of a tower and being connected via a cable to a submerged high voltage power export cable for exporting the electricity generated by the at least two windmills,
the mooring system comprising a turntable extending at least partly above water level and being above water level attached to the open structure via an arm such that the open structure can weathervane around a rotation axis of the mooring system,
the mooring system supporting on its rotation axis an electrical swivel,
the stator of which is connected to the submerged high voltage power export cable and the rotor of which is connected to the cables of the wind turbines,
wherein the floating open structure comprises a central control power electronic unit placed on the floating open structure connected to the cables of the wind turbines and to the rotor of the swivel, and
wherein the floating open structure is connected to the turntable via a pivoting yoke comprising two interconnected arms extending from spaced-apart connection points on the open structure to the turntable, the arms including an acute angle.

2. The floating energy generating device as claimed in claim 1, wherein the floating open structure is provided with ballast tanks which are ballasted during transport mode.

3. The floating energy generating device as claimed in claim 1, wherein the at least two wind turbines are provided with foldable or retractable blades.

4. The floating energy generating device as claimed in claim 1, wherein the export cable of one or more floating energy generating devices is connected to the export cable or power electronics unit of a central floating energy generating device, so to create an offshore farm of floating energy generating devices.

5. The floating energy generating device as claimed in in claim 1, wherein the floating open structure provides a protected landing area for a maintenance vessel.

6. The floating energy generating device as claimed in in claim 1, wherein the floating open structure can be connected and disconnected from the arm.

7. The floating energy generating device according to claim 1, wherein the floating open structure supports at least one submerged wave power generating system, and the power produced is exported to the single control power electronic unit that collects also the electricity produced by the windmills.

8. The floating energy generating device according to claim 1, wherein decoupling means are provided that limit the stress exerted on the high voltage power export cable.

9. The floating energy generating device according to claim 8, wherein the decoupling means comprise buoyancy means provided on the high voltage power export cable in order for the cable to have a lazy-S configuration as it extends toward the sea bottom.

10. The floating energy generating device according to claim 8, wherein the decoupling means comprise a helical multispool cable means having a first end connected to said high voltage power export cable and having a second end connected to the central control power electronic unit on the floating open structure said helical cable means being capable of transforming the bending of the top part of the high voltage power export mostly in torsion in the spools.

11. The floating energy generating device according to claim 9, wherein the decoupling means comprise both buoyancy means provided on the high voltage power export cable and a helical multi-spool cable means having a first end connected to said high voltage power export cable and having a second end connected to the central control power electronic unit on the floating open structure.

12. The floating energy generating device according to claim 11, wherein the decoupling means comprise both buoyancy means provided on the high voltage power export cable and a helical multi-spool cable means having a first end connected to said high voltage power export cable and having a second end connected to the central control power electronic unit on the floating open structure.

\* \* \* \* \*